United States Patent [19]

Boudreau et al.

[11] 3,775,746

[45] Nov. 27, 1973

[54] METHOD AND APPARATUS FOR DETECTING ODD NUMBERS OF ERRORS AND BURST ERRORS OF LESS THAN A PREDETERMINED LENGTH IN SCRAMBLED DIGITAL SEQUENCES

[75] Inventors: Paul E. Boudreau, Raleigh, N.C.; Robert T. Chien, Urbana, Ill.; Charles C. Peck, Whitehall, S.C.

[73] Assignee: International Business Machines Corporation, Armonk, N.Y.

[22] Filed: May 19, 1972

[21] Appl. No.: 254,975

[52] U.S. Cl. .......................................... 340/146.1 AL

[51] Int. Cl. .......................................... G06f 11/12

[58] Field of Search .......... 340/146.1 AL, 146.1 A, 340/146.1 AQ; 325/41

[56] References Cited

UNITED STATES PATENTS

| | | | |
|---|---|---|---|
| 3,278,729 | 10/1966 | Chien | 340/146.1 AL |
| 3,487,362 | 12/1969 | Frey, Jr. | 340/146.1 AL |
| 3,512,150 | 5/1970 | Ohnsorge | 340/146.1 AL |
| 3,582,881 | 6/1971 | Burton | 340/146.1 AL |
| 3,649,915 | 3/1972 | Mildonian, Jr. | 325/41 |

OTHER PUBLICATIONS

W. W. Peterson, Error Correcting Codes, MIT Press and John Wiley & Sons, 1961, Chapters 4–11.

*Primary Examiner*—Charles E. Atkinson
*Attorney*—Robert B. Brodie et al.

[57] ABSTRACT

If digital data sequences of length $n$ bits are successively encoded for protection against error by appending to each block of $n$ bits in a sequence of $r$ check bits, the $r$ check bits being calculated from the $n$ bits of the block by iteratively dividing the data stream, by a generator polynomial $g(x)$ prior to each transmission and then by iteratively dividing the data sequence and remainder by a scrambler polynomial $S(x)$, then the apparent error $E(x)$ at the receiver due to channel error $e(x)$, after descrambling (multiplying) by polynomial $S(x)$, is represented by the relation $E(x) = S(x)\, e(x)$. When scrambling polynomial $S(x)$ is of the form $S(x) = 1 + x$, then each channel error is replaced by two adjacent errors, hence $E(x) = (1 = x)\, e(x)$. All single and odd errors are nevertheless detectable in such circumstances by modifying $g(x)$ such that $g(x) = (1 + x)^{m+1}\, t(x)$. Furthermore, burst type channel error of length $\leq b$ is detectable, in addition to all single and odd errors, if the scrambler polynomial $S(x)$ assumes the form $S(x) = (1 + x)^m f(x)$ and the generator polynomial is modified so that $g(x) = (1 + x)^{m+1}\, t(x)$ where $f(x)$ and $t(x)$ are polynomials having an odd number of terms and relatively prime and $t(x)$ is of degree $\geq b$.

10 Claims, 8 Drawing Figures

SYSTEM DIAGRAM

ENCODER FOR $g(x)=1+x^2$

DATA TRANSMISSION 7c at 7b and 10c at 10b

CRC 7c at 7a and 10c at 10a

NRZI SCRAMBLER $S(x) = 1+x$

NRZI DESCRAMBLER $S(x)= 1+x$

DECODER FOR $g(x)=1+x^2$

ENCODER FOR $g(x)=(1+x)^3(1+x+x^4)$

DATA TRANS.

7c at 7b & 10c at 10b

CRC 7c at 7a & 10c at 10a

DECODER FOR $g(x)=(1+x)^3(1+x+x^4)$

TIME & ERROR ANALYSIS DIAGRAM $g(x)=1+x^2$ and $S(x)=1+x$

METHOD AND APPARATUS FOR DETECTING ODD NUMBERS OF ERRORS AND BURST ERRORS OF LESS THAN A PREDETERMINED LENGTH IN SCRAMBLED DIGITAL SEQUENCES

BACKGROUND OF THE INVENTION

This invention relates to the method and apparatus for detecting errors in cyclically encoded digital sequences, and more particularly where such sequences are normally scrambled prior to transmission and descrambled after reception.

Let us consider for a moment several aspects of cyclic encoding of digital data and the function served, as well as the effect of scramblers on errors. In this regard reference will be made to W. W. Peterson, "Cyclic Codes for Error Detection," Proceedings of the IRE, January, 1961, pages 228–235; J. C. Kennedy et al., "Burst Error Detector," U.S. Pat. No. 3,465,287, issued Sept. 2, 1969; D. T. Tang, "Coding Method to Minimize Intersymbol Interference," IBM Technical Disclosure Bulletin, Vol. 11, No. 12, May, 1969, pages 1623–1624.

Some Properties of Cyclic Codes

Peterson describes the encoding of sequences of $n-r$ successive digits by appending $r$ digits as a check and transmitting the $n-r$ information digits and the $r$ check digits. Relatedly, he used polynomial representation of binary information. That is, he found it convenient to think of any sequence of binary digits as coefficients of corresponding polynomial terms of a dummy variable. In this notation, a block of n bits was represented by successive polynomial terms up to degree $n-1$.

As an example, the sequence of 0110111 would be represented as $x+x^2+x^4+x^5+x^6$. Also, the sequence 110101 would be denoted by $1+x+x^3+x^5$. The convention was that the terms of the polynomial are written low to high order. This was because the polynomial terms were considered as being transmitted serially, high order first. As Peterson points out, the ordinary laws of algebra applied except that addition was to be done modulo two. Illustratively, $$(1+x)^2 = 1+x\ x+x^2/1\ +ox+x^2 = 1+x^2$$

Following Peterson, then a cyclic code is considered as a subset of the $2^n$ possible sequences of $n$ bits. In polynomial notation, it is a subset of all possible polynomials of degree $\leq n-1$, i.e., $a_o + a_1 x + a_2 x^2 + \cdots + a_{n-1} x^{n-1}$.

A cyclic code may be defined with a generator polynomial $g(x)$. It consists of those multiples of $g(x)$ that are of degree $\leq n-1$. It can be readily shown that there are exactly $2^{n-r}$ polynomials that are both multiples of $g(x)$ and have degree $\leq n-1$. Accordingly before transmission, a sequence is encoded to be a multiple of the generator polynomial.

As an example, consider a cyclic code of $n = 7$ bits with a generator polynomial $g(x) = 1 + x^2 + x^3 + x^4$. There are $2^{n-r} = 2^{7-4} = 2^3 = 8$ polynomials which are multiples of $g(x)$. We note that any error pattern of the form $x^i\,E(x)$ is detectable where $i$ is any positive integer and $E(x)$ is not divisible by $g(x)$. For proof of this fact, the reader is referred to the Peterson reference.

Cyclic Codes & Error

Two classes of error are of interest. These are odd number of errors and burst errors. The detection of error patterns containing odd errors can be achieved by simple parity. The generator polynomial for such a code is $g(x) = 1 + x$. This is confirmed by the fact that all polynomials containing an even number of terms are divisible by $1 + x$. For instance the polynomial $1 + x + x^5 + x^7$ is divisible by $1 + x$.

Burst error of length b is defined as an error pattern which spans $\leq$ b consecutive bit positions. It can be represented by the polynomial $x^i\,B(x)$ where $B(x)$ is a polynomial of degree $\leq b-1$. Illustratively, a burst error of length $b \leq 3$ is $x^i\,B(x) = x^7 + x^8 + x^9$. Alternatively, a burst error of $b \leq 5$ could be represented as $x^iB(x) = 1 + x^4$.

Burst Error Protection Characteristics of A Generator Polynomial

In order to detect burst error of length $\leq b$ based on the foregoing discussion, the generator polynomial should possess the properties:

1. $g(x)$ is of a degree $\geq b$.
2. $g(x)$ has a non-zero constant term.

Thus, all errors of the form $E(x) = x^iB(x)$ would be detected as long as $E(x)$ could not be divided by $g(x)$. Note, by virtue of condition (2) $g(x)$ does not contain any factor of the form of $x^i$. For example if $g(x) = 1 + x$, then it may be shown that $x^i/x+1$ always yields a remainder. In order for $g(x)$ to divide $E(x)$, it must then divide $B(x)$. By virtue of condition (1) $g(x)$ is of higher degree than $B(x)$ and cannot therefore divide $B(x)$. Typically, $g(x) = 1 + x^4$ would detect all bursts of length $b \leq 4$ and $g(x) = 1 + x + x^{15}$ would detect all bursts of length $b \leq 15$.

Scramblers

So far it has been pointed out that by suitably shaping a generator polynomial odd errors and burst errors may be detected at the receiver. Relatedly, scrambling refers to the operation of introducing randomness so as to reduce or avoid the effects of the interference. Typically, the scrambler is placed between the encoder and the transmission line, while the descrambler interacts with the received digital sequences prior to their decoding.

Scrambling is a special form of encoding and it also has the effect of dividing the data stream by a polynomial. Likewise, descrambling has the effect of multiplying a received sequence by a polynomial.

A frequently used scrambler, termed an NRZI scrambler, generates alternating binary signals for successive applied signals taken two at a time according to the polynomial $S(x) = 1+x$. Thus, for a matching data sequence $-x^{i-2} + x^{i-1} + x^i + x^{i+1}$, the output sequence would be $x^{i-1} + x^{i+1}$.

Suppose for a string of matched digits, e.g., 1111, an NRZI scrambler correctly encoded them as 1010 $(1 + x^2)$, and that the sequence 0010 $(x^2)$ was received. The descrambler would multiply the received sequence $(x^2)$ by the scrambling polynomial $(1+x)$. Algebraically, $(1+x)(x^2) = x^2 + x^3$. This means that a single error is converted into double adjacent and non-parity-detectable error. Restated, for a channel error $e(x)$, the apparent error $E(x)$ is $S(x)\,e(x)$. In the example, for $e(x) = x^2$ and $S(x) = 1 + x$, $E(x) = x^2 + x^3$.

Originally, the cyclic code included the factor $1 + x$ to detect all single and odd errors. It is painfully apparent that with descrambling these errors are multiplied by $S(x)$ and are therefore undetectable.

SUMMARY OF THE INVENTION

It is an object of the invention to devise a method and apparatus for detecting odd numbers of errors in normally scrambled digital sequences. It is a related object to detect burst errors in such sequences of burst length $\leq b$ bits.

The invention satisfying the objects is in part premissed on the unexpected observation that double adjacent errors in a digital sequence, as expressed in polynomial form, are not divisible by $1 + x^2$.

In the first instance, the invention is embodied in a digital data transmitter comprising a cyclical encoder for converting digital data sequences by dividing the sequences by a selected polynomial $g(x)$; and a scrambler for further dividing the encoded sequences by the polynomial $S(x) = 1 + x$, wherein the polynomial $g(x)$ has the form $g(x) = (1 + x^2)\ t(x)$. For the general case, it has been found that all odd errors are detectable where $S(x) = (1 + x)^m f(x)$ and $g(x) = (1 + x)^{m+1} t(x)$ and where $f(x)$ and $t(x)$ each contain an odd number of terms.

Where burst errors of duration less than or equal to b bits are to be detected in the presence of scramblers, in addition to detecting odd errors, then $S(x) = (1 + x)^m f(x)$ and $g(x) = (1 + x)^{m+1} t(x)$ where $f(x)$ and $t(x)$ are relatively prime and $t(x)$ is of degree $\geq b$. Also both $t(x)$ and $f(x)$ each contain odd numbers of terms.

DESCRIPTION OF THE PREFERRED EMBODIMENT

Figure 1:
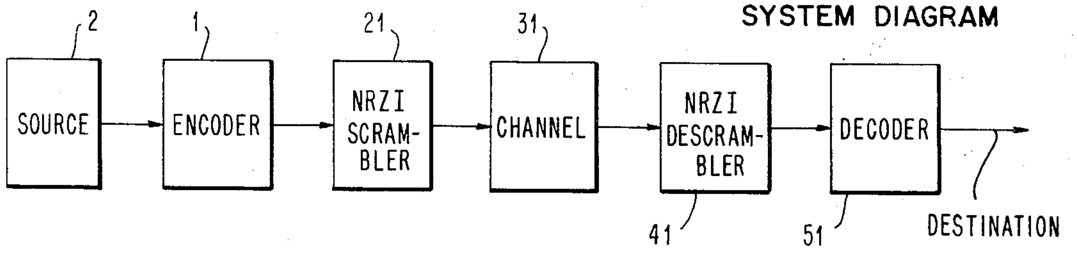
FIG. 1 shows a digital data transmission system including scramblers within which the invention is embodied.

Referring now to FIG. 1, there is shown a system block diagram of a digital data transmission system. A source 2 of sequences of digital data is applied to encoder 1. The encoder appends to each block of n consecutive digits *r* checking digits or remainder bits. The remainder bits are obtained from a calculation performed by the encoder from the *n* bits of any given block. This calculation comprises the steps of iteratively dividing the sequence by the polynomial $g(x)$. The data block together with the remainder bits are in turn iteratively divided by polynomial $S(x)$ of NRZI scrambler 21. Depending upon the communication channel 31 requirements, the scrambled and encoded digital sequences are either applied directly or through a suitable modulator (not shown). At the receiving side, the sequences would be demodulated and applied to an NRZI descrambler 41. The descrambler iteratively multiplies the sequences by $S(x)$. The descrambled data series is then applied to a decoder 51.

Before describing the structure and operation of FIGS. 2 through 7, let us digress to establish the formal correctness of the properties of the generating and scrambling polynomials. In this art, this is customarily done through several "theorems" and their respective "proofs."

Theorem 1: If scrambling polynomial $S(x) = 1 + x$, then the generating polynomial $g(x) = (1 + x^2)\ t(x)$ detects all odd numbers of channel errors, $t(x)$ being an arbitrary polynomial.

Proof: In order to detect all odd numbers of channel errors $e(x)$ it is necessary to show that $g(x)$ does not divide the polynomial expression for the apparent error $E(x)$. One should recall that $E(x) = S(x)\ e(x) = (1 + x)\ e(x)$. Let us now argue indirectly by assuming that $g(x)$ does divide $(1 + x)\ e(x)$. Accordingly, $e(x)$ is divisible by $(1 + x)$. This implies that $e(x) = (1 + x)\ v(x) = v(x) + xv(x)$. However, under this assumption $e(x)$ has an even number of channel errors. This contradicts the premise that $e(x)$ contained an odd number of terms. Therefore, $g(x)$ does not divide $E(x)$.

Theorem 2: Let the scrambler polynomial $S(x) = (1 + x)^m f(x)$ and $g(x) = (1 + x)^{m+1} t(x)$ where $f(x)$ contains an odd number of terms, then $g(x)$ generates a cyclic code which detects all odd numbers of channel error $e(x)$ in the presence of the scrambler and descrambler.

Proof: Let $e(x)$ be the polynomial representation of channel error containing an odd number of terms. Again arguing indirectly, let us assume that $g(x)$ does divide the apparent error $E(x) = S(x)\ e(x) = (1 + x)^n f(x)\ e(x)$. This may be represented by $$E(x)/g(x) = (1 + x)^m f(x)\ e(x)/(1 + x)^{m+1} t(x) = f(x)\ e(x)/(1 + x)\ t(x)$$

Consequently, in order for $f(x)$ and $e(x)$ to be divisible by $1 + x$ and following proof of theorem 1, then $f(x) = (1 + x)\ u(x)$ or $e(x) = (1 + x)\ v(x)$. Since neither $f(x)$ and $e(x)$ should contain even numbers of terms, then this contradicts the premise. Therefore, it is shown that $g(x)$ does not divide $E(x)$.

Theorem 3: If the scrambler polynomial is $S(x) = (1 + x)^m f(x)$ and $g(x) = (1 + x)^m\ t(x)$ where $t(x)$ is relatively prime to $f(x)$ and is a polynomial of degree $\geq b$, then a code is generated for detecting burst channel errors of $\leq b$ bits in the presence of scrambling in the system.

Theorem 4: If it is desired to detect all odd numbers of channel errors and burst errors $\leq b$, then the scrambler polynomial must be of the form $S(x) = (1 + x)^m f(x)$ and the generator polynomial $g(x) = (1 + x)^{m+1} t(x)$ where $f(x)$ and $t(x)$ are relatively prime. Also, $f(x)$ and $t(x)$ contain an odd number of terms where $t(x)$ is of degree $\geq b$.

Proof: By way of example, let $S(x) = (1 + x)^2\ (1 + x + x^3)$ with the view toward deriving $g(x)$ which will detect all odd numbers of channel errors as well as detecting all bursts $\leq 5$. Recalling that $g(x) = (1 + x)^{m+1} t(x)$, that $m = 2$, and that $t(x)$ must contain an odd number of terms of degree $\leq 5$, then $g(x) = (1 + x)^3\ (1 + x + x^4)$ will satisfy the conditions.

Any even number of apparent errors can be expressed as $E(x) = (1 + x)\ e(x)$. Since the burst length $b$ must be $\leq 5$, then the polynomial $e(x)$ must be of degree $\leq 3$. Consequently, $e(x)$ cannot be divided by $g(x)$. It follows that $g(x)$ will detect all odd numbers of line errors and all even numbers of line errors of length $\leq 5$.

Figure 2:
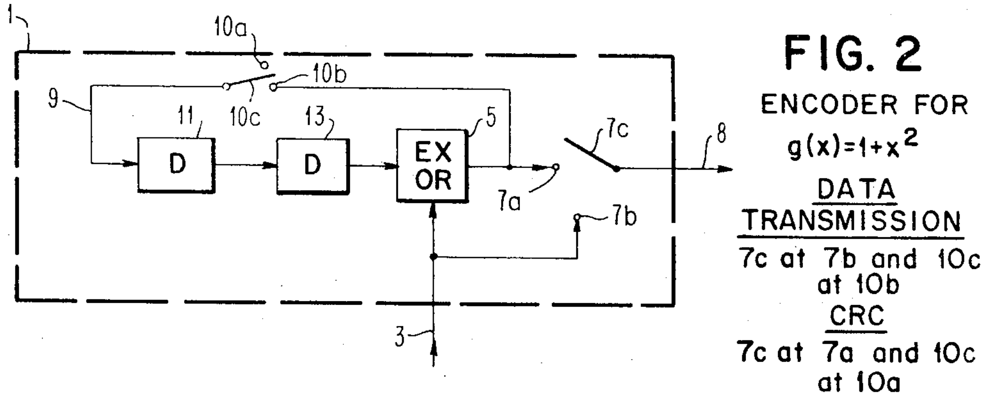
FIGS. 2 and 5 set forth an encoder and decoder for the odd error detection and generating polynomial $g(x) = 1 + x^2$.
Figure 3:
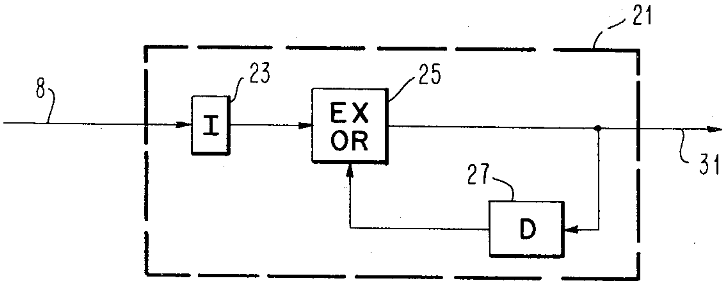
FIGS. 3 and 4 illustrate NRZI scramblers and descramblers respectively.

Referring now to FIG. 2, there is shown an encoder 1. Each digital data sequence from source 2 is applied to the encoder over path 3. The encoder transmits the data sequence and then sends the check bits. The check bits are obtained from the separate division of the data sequence by the code polynomial $g(x)$. To this extent, the data is applied to the encoder on two paths simultaneously. One path consists of line 3, switch 7c at position 7b, and line 8. The other path includes Exclusive OR gate 5, feedback path 9, through closed switch 10c at 10b.

In this embodiment of the invention, a block of digital data of $n-r$ bits has appended to it prior to transmission $r$ remainder bits. The $r$ check bits are obtained by applying the data sequence to the encoder as the data is being transmitted on line 8. This ensures that check digits will always be available immediately after the last data digit is sent.

When the data sequence is applied to line 3, switch 7c couples 7b and 10c couples 10b. Each bit, while transmitted, is applied also to gate 5. This Exclusive OR gate generates a binary "one" only if there is a mismatch between its inputs. Accordingly, a 1 is generated only upon a mismatch between a digit on line 3 and the contents of delay element 13. The output of the gate is then circulated on path 9 and applied to delay element 11. The contents of this delay element are in turn shifted to delay element 13. Upon the last data digit being transmitted, switches 7c and 10c are respectively connected to 7a and 10a. As a result, the path 9 is opened and the contents of the delay elements are transferred to line 8.

Figure 5:
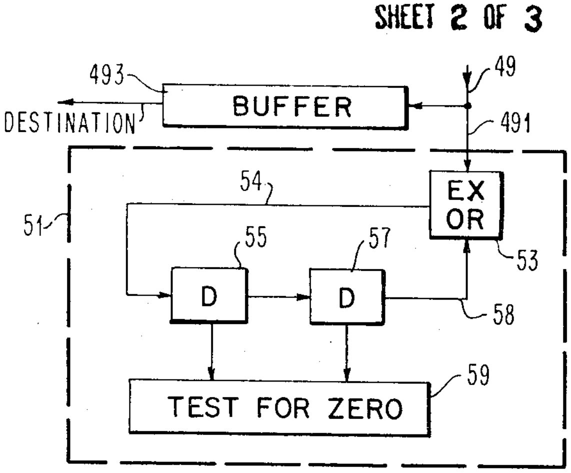

Referring now to FIG. 5, there is shown a logic diagram of a decoder at the receiver. The decoder 51 has the function of multiplying the received data and check bits by the generator polynomial $g(x)$. If there has been change of an odd number of bits in transmission, then this change will appear as two 1s in delay elements 55 and 57. In the absence of the occurrence of odd numbers of error, both bits should be )s. Note, that the data is also stored in a buffer register 493. The decoder tests the data and if found error free, causes the contents of the register 493 to be read out to a destination or utilization circuit.

Figure 8:
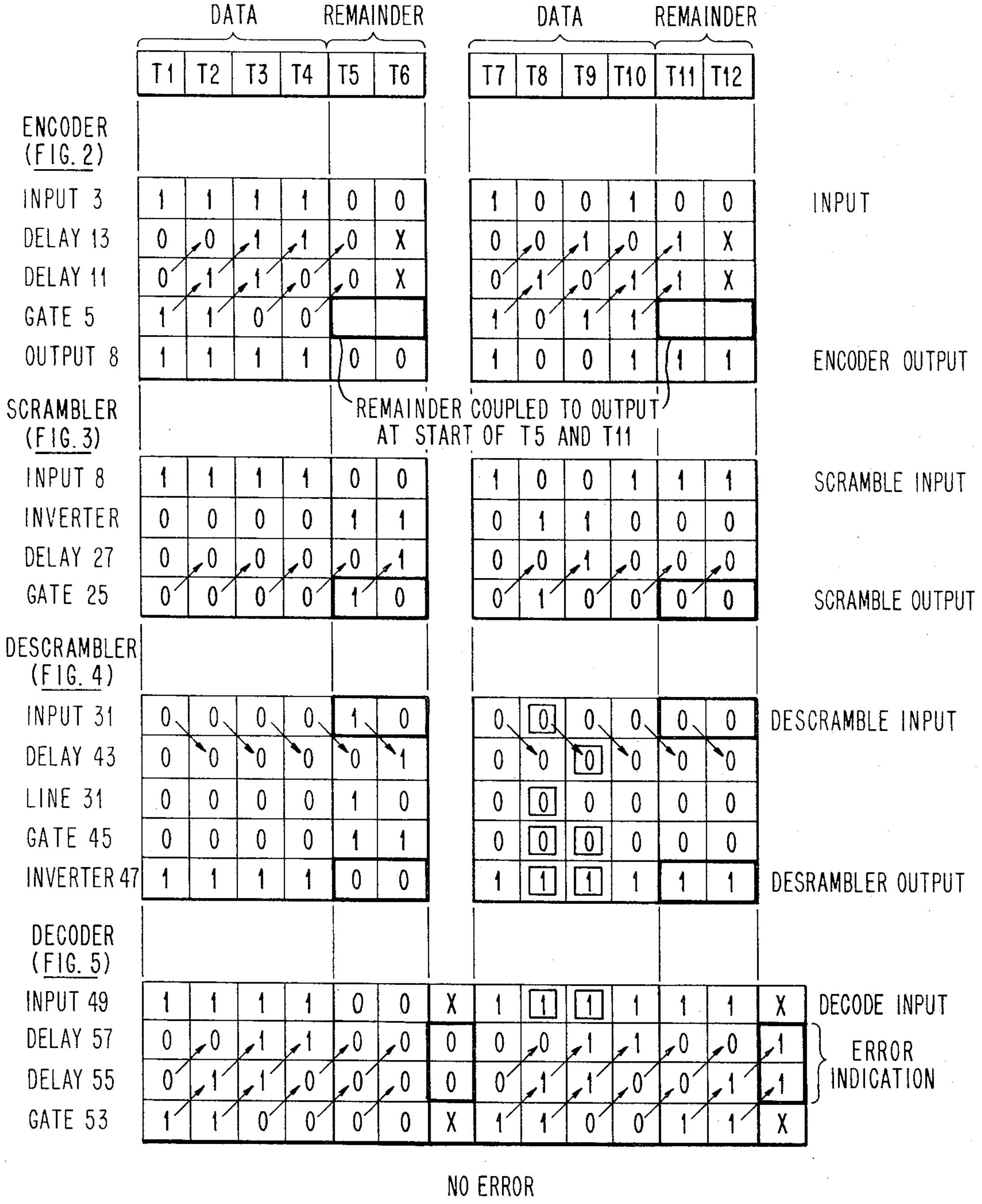
FIG. 8 represents a timing and error analysis diagram for the system in FIGS. 2 - 5 connected as in FIG. 1.

To best illustrate the operation of the invention, reference should be made to FIG. 8. This figure represents a timing and error analysis of the logical response of a digital data system. The system includes the encoder (FIG. 2), the NRZI scrambler (FIG. 3), the NRZI descrambler (FIG. 4), and the decoder (FIG. 5), the elements being connected as is shown in FIG. 1.

In FIG. 8, successive bit time intervals T1 through T12 mark their respective columns. Suppose an input of four bits 1111 is applied to the encoder input 3 during intervals T1, T2, T3, and T4 and during T7, T8, T9, and T10 another data sequence 1001 is applied. Intervals T5, T6, and T11 and T12 are reserved for the transmission of the check bits. For purposes of the analysis, it is assumed that the initial contents of the encoder 1 delay elements 11 and 13 are "zero."

The instantaneous output of the encoder output on line 8 during T1 - T4 is 1111 and during T7 - T10 is 1001. Also, at the Exclusive OR gate 5 check bits coupled to line 8 during time T5 and T6 are 0 and 0 and during T11 - T12 are 1 and 1, respectively. The contents of scrambler delay element 27 are assumed "zero" at time T1 and T7. During interval T1 - T6, the scrambler output sequence is 000010 for a corresponding input sequence of 111100. Similarly, during interval T7 - T12, the output sequence of 010000 was generated for the input sequence of 100111.

Figure 4:
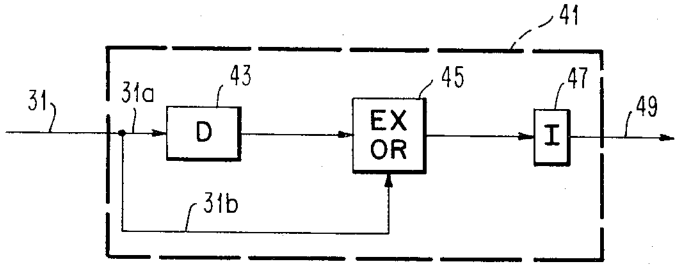

The scrambled sequence is applied to a transmission medium such that it arrives with some of its symbols possibly corrupted by the noise of the medium at the receiver descrambler 41. At the other end of the line is a receiver comprising a descrambler as shown in FIG. 4. The descrambler begins its operation also starting at time T1. Note, for purposes of exposition synchronization and clocking considerations are not of interest. In this regard, there should be no loss of generality in the different fields of use to which the invention may be applied. If one follows the iteratively multiplication taking FIGS. 4 and 8 together, then it is apparent that the output on line 49 (inverter 47) during T1 – T6, is 111100 for an input sequence 000010. Similarly, the output sequence 111111 is obtained during T7–T12 for a corresponding input 000000. The output from descrambler 41 is serially applied to decoder 51 depicted in FIG. 5 over line 49. The descrambler output is also loaded into a buffer 493. As it is being loaded into the buffer, decoder 51 begins dividing each digit from line 49 by the coding polynomial $g(x)$. If, as a result of the last two digits stored in delay elements 55 and 57 during times T6 and T12 are both "zero," then no error has been detected. For the period T1 - T6, no error was detected. Thus, at time T6 as set forth in FIG. 8, the contents of delay elements 55 and 57 are both "zero." However, a single error was observed during T8 at the descrambler input 31a. This single error was multiplied and is seen as a double adjacent error at the descrambler inverter output 47 during intervals T8 and T9. It is to be noted that the contents of the delay elements 55 and 57 are both "one" at T12 providing an indication of error.

Referring especially to FIG. 5 for the time intervals T4, T5, T6, it is of interest to study the treatment of the two check bits in the decoder 51. During T4 the line 49 input is 1, while the contents of delay elements 55 and 57 are 0 and 1 respectively. Now the exclusive OR gate 53 generates a 1 on line 54 only if there is a mismatch between the binary input on line 49 and the contents of delay element 57. Accordingly, at T4 for a matching 1 on the line and 1 in delay 57, gate 53 produces a 0. This output is shifted into delay element 55 at the beginning of interval T5. The contents of that register are, in turn, shifted to delay 57. During T5 the input is 0, the delay element 57 output is 0. A zero is generated by gate 53. At T6, the gate 53 contents enter delay 55 as a "zero," while the delay 55 contents of "zero" are shifted into delay 57. Since the input at line 49 and the delay content of 57 are both zeroes, the gate 53 contents will be a zero. At the end of T6, both of the delay contents of 55 and 57 are zero. This is indicative of NO ERROR detected. Note: if the last shift is not carried out, the error at the last bit of the input sequence will not be detected.

What happens in the same system during T6 - T12 for the arbitrary input 1001 if a single error occurs in say the second bit position (T8) of an encoded sequence during transmission? This error is introduced at the descrambler input 31a. During the intervals T7, T8, T9, and T10, the successive arbitrary data digits 1001 are encoded and transmitted in the same manner as before. However, the error occurring at T8 at the descrambler input will be decoded as two adjacent errors (in this case the single error was changing a 1 from a 0). The double adjacent errors appear at the descrambler inverter output 47 during T8 and T9. This can be easily seen by comparing the descrambler outputs during T2 and T3 with that of T8 and T9. By tracing through the action of the decoder as previously described it will be apparent that the contents of delay elements 55 and 57 will both be "one" at the end of T12. This is indicative of error. Referring again to FIGS. 2 and 8, it should be apparent that between the T4 and T5 and T10 and T11 intervals, the switch 10c is opened by connecting it from 10b to 10a. Also, switch 7c is coupled to 7a. Consequently, the contents of delay elements 11 and 13 occurring during T4 and T10 will be respectively shifted out during the corresponding time intervals T5, T6 and T11, T12.

Figure 6:
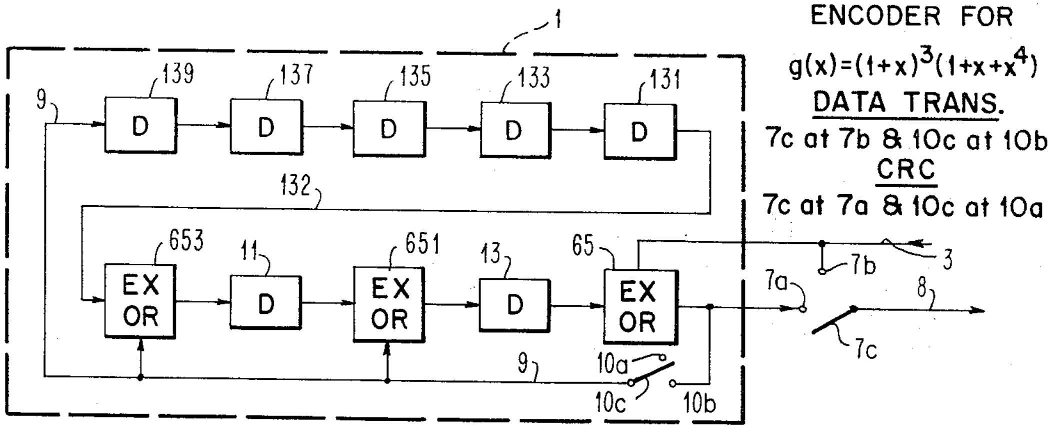
FIGS. 6 and 7 detail an encoder and decoder for burst and odd error detection and generating polynomial $g(x) = (1 + x)^3\ (1 + x + x^4)$.
Figure 7:
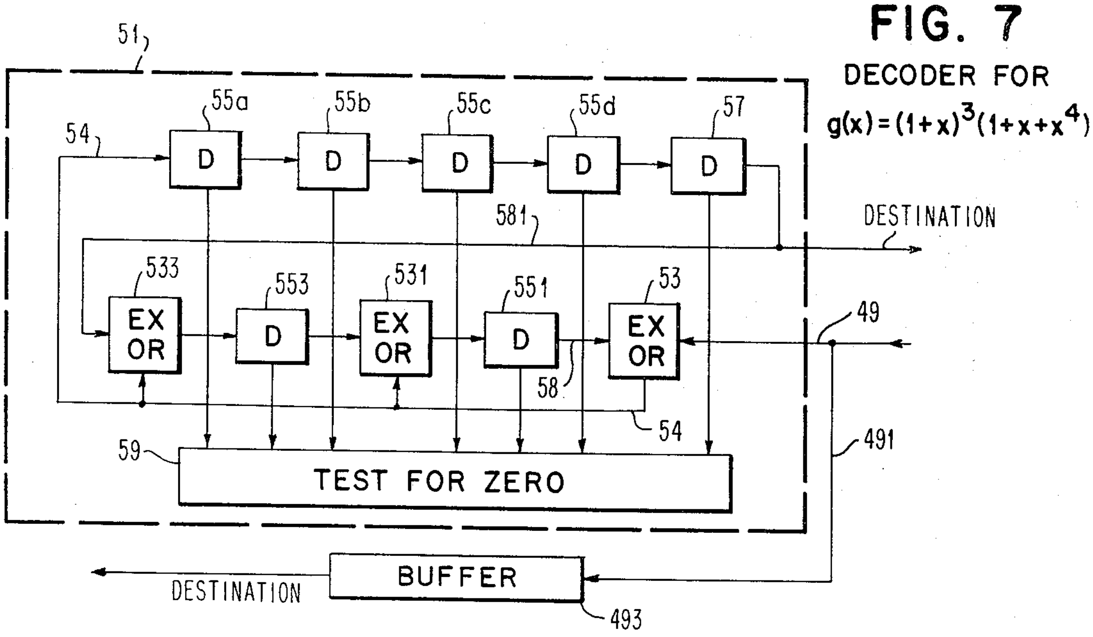

If one were to substitute the encoder shown in FIG. 6 for that shown in FIG. 2 and additionally substitute the decoder of FIG. 7 for that of FIG. 4, it would be possible to trace through the logical action of each stage and verify the capability of the method and apparatus to detect both odd numbers of errors and burst errors.

It is observed that the encoder of FIG. 7 represents a more complex polynomial $g(x) = (1+x)^3 (1+x+x^4)$ than that of FIG. 2 $g(x) = 1 + x^2$. The exact principles of its design and construction being apparent from W. W. Peterson, "Error-Correcting Codes" published by the M.I.T. Press, Cambridge, Mass., copyrighted 1961, Library of Congress Card No. 61-8797. Furthermore, an analysis similar to that shown in FIG. 8 can be used to verify or confirm the logical properties of a system connected as in FIG. 1.

This description of the present invention has been given as an example and it will be understood that various changes in form and details may be made therein without departing from the spirit and scope of the invention.

What is claimed is:

1. A method for detecting odd numbers of errors and burst errors of length ≤ $b$ bits in scrambled digital data sequences comprising the steps of:

encoding each $n-r$ bit digital block of data sequence prior to transmission by appending to the data sequence a remainder obtained from the successive division of the data sequence by a coding polynomial $g(x) = (1 + x)^{m+1} t(x)$; and then iteratively dividing the data sequence and remainder by scrambling polynomial $S(x) = (1 + x)^m f(x)$, where $t(x)$ and $f(x)$ are polynomials each being relatively prime and containing an odd number of terms, and where $t(x)$ is of degree ≥ $b$;

decoding each received data sequence by the successive iteratively multiplication of the received sequence by the polynomial $S(x)$; and detecting error from the presence of a predetermined bit pattern obtained by dividing the received sequence by $g(x)$.

2. A method according to claim 1, wherein each block of data sequence is transmitted as a data sequence of n—r bits and remainder of r bits with the remainder being formed as the data bits are transmitted, the remainder being transmitted afterwards; and further wherein the last $r$ bit positions constituting the remainder also constitute a preselected portion of the decoded and iteratively multiplied data sequence wherein the predetermined bit pattern is to be found.

3. A method for detecting odd numbers of errors in scrambled digital data sequences comprising the steps of:

encoding each n bit digital block of data sequence prior to transmission by appending to the data sequence a remainder formed from the successive iteratively division of the data sequence by a coding polynomial $g(x) = (1 + x)^m t(x)$ and then iteratively dividing the data sequence and remainder by the scrambling polynomial $S(x) = 1 + x$, where $t(x)$ is any polynomial having an odd number of terms;

decoding each received data sequence by the successive iteratively multiplication of the received sequence by the polynomial $S(x)$; and detecting error from the presence of a predetermined bit pattern obtained by dividing the received sequence by $g(x)$.

4. A method for detecting burst errors of length ≤ $b$ bits in scrambled digital data sequences comprising the steps of:

encoding each $k$ bit digital block of data sequence prior to transmission by appending to the data sequence a remainder formed from the successive division of the data sequence by a coding polynomial $g(x) = (1 + x)^m t(x)$ and then iteratively dividing the data sequence and remainder by scrambling polynomial $S(x) = (1 + x)^m f(x)$; where $t(x)$ and $f(x)$ are polynomials each being relatively prime and containing an odd number of terms, and where $t(x)$ is of degree ≥ $b$;

decoding each received data sequence by the successive iterative multiplication of the received sequence by the polynomial $S(x)$; and detecting error from the presence of a predetermined bit pattern obtained by iteratively multiplying the received sequence by $g(x)$.

5. A method according to claim 1, wherein the coding polynomial assumes the form $g(x) = (1 + x)^3 (1 + x + x^4)$ and the scrambling polynomial assumes the form $S(x) = (1 + x)^2 (1 + x + x^3)$.

6. In a digital data transmission system comprising a digital data source; a transmitter for applying suitably modulated digital data sequences from the source to a communications medium; and a receiver coupled to the medium for converting the modulated sequences back into the original sequences; the improvement comprises:

in the transmitter:

means for appending to each $k$ bit digital block of data sequence, prior to transmission a remainder formed by dividing the data sequence by an encoding polynomial of the form $g(x) = (1 + x)^{m+1} t(x)$; and means for iteratively dividing the data sequence and remainder by a scrambling polynomial of the form $S(x) = (1 + x)^m f(x)$; where $t(x)$ and $f(x)$ are polynomials each being relatively prime and containing an odd number of terms; and where $t(x)$ is of degree ≥ $b$;

in the receiver:

means for decoding each received data sequence by successively iteratively multiplying each sequence by the scrambling polynomial $S(x)$; and means for detecting the occurrence of either an odd number of errors or a burst error of duration ≤ $b$ bits from the presence of a predetermined bit pattern obtained by dividing the received sequence by $g(x)$.

7. In a digital transmission system according to claim 6; wherein in the transmitter and in the receiver the coding polynomial is of the form $g(x) = (1 + x)^3 (1 + x + x^4)$ and the scrambling polynomial is of the form $S(x) = (1 + x)^2 (1 + x + x^3)$.

8. In a digital data transmission system comprising a digital data source; a transmitter for applying suitably modulated digital data sequences from the source to a communications medium; and a receiver coupled to the medium for converting the modulated sequences back into the original sequences; wherein the improvement comprises:

in the transmitter:

means for appending to each n bit digital block of data sequence, prior to transmission, a remainder formed by dividing the data sequence by the encoding polynomial $g(x) = (1 + x)^m t(x)$; and means for iteratively dividing the data sequence and the remainder by the scrambling polynomial $S(x) = 1 + x$;

in the receiver:

means for decoding each received data sequence by iteratively multiplying each sequence by the scrambling polynomial $S(x)$; and means for detecting the occurrence of an odd number of errors by the presence of a predetermined bit pattern obtained by dividing the received sequence by $g(x)$.

9. In a digital transmission system according to claim 8, the means for detecting errors include means for testing whether the last m bits of each decoded sequence are of binary zero value.

10. In a digital transmission system according to claim 7, wherein upon the encoding polynomial assuming the form $g(x) = (1 + x)^m t(x)$ then only bursts errors of length $\leq b$ bits become detectable.

* * * * *